US010035938B2

(12) United States Patent
Rached

(10) Patent No.: US 10,035,938 B2
(45) Date of Patent: *Jul. 31, 2018

(54) HEAT TRANSFER FLUID REPLACING R-134A

(71) Applicant: ARKEMA FRANCE, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,883

(22) Filed: Aug. 17, 2016

(65) Prior Publication Data
US 2016/0355718 A1 Dec. 8, 2016

Related U.S. Application Data

(63) Continuation-in-part of application No. 14/615,741, filed on Feb. 6, 2015, which is a continuation of application No. 13/391,417, filed as application No. PCT/FR2010/051727 on Aug. 17, 2010, now Pat. No. 9,011,711.

(30) Foreign Application Priority Data

Sep. 11, 2009 (FR) ..................... 09 56245

(51) Int. Cl.
C09K 5/04 (2006.01)
F25B 45/00 (2006.01)
F25B 9/00 (2006.01)

(52) U.S. Cl.
CPC ............. C09K 5/045 (2013.01); F25B 45/00 (2013.01); C09K 2205/126 (2013.01); C09K 2205/22 (2013.01); C09K 2205/40 (2013.01); F25B 9/006 (2013.01); F25B 2400/18 (2013.01)

(58) Field of Classification Search
CPC ............. C09K 5/045; C09K 2205/126; C09K 2205/122; C09K 2205/22; C09K 2205/40
See application file for complete search history.

(56) References Cited

U.S. PATENT DOCUMENTS

| 6,176,102 | B1 | 1/2001 | Novak et al. |
| 6,503,417 | B1 | 1/2003 | Bivens |
| 8,070,977 | B2 | 12/2011 | Rached |
| 8,075,798 | B2 | 12/2011 | Rached |
| 8,246,850 | B2 | 8/2012 | Rached |
| 8,252,198 | B2 | 8/2012 | Rached |
| 8,557,135 | B2 | 10/2013 | Rached |
| 8,808,569 | B2 | 8/2014 | Rached |
| 8,858,824 | B2 | 10/2014 | Boussand |
| 8,858,825 | B2 | 10/2014 | Guerin et al. |
| 9,011,711 | B2 | 4/2015 | Rached |
| 9,028,706 | B2 | 5/2015 | Rached et al. |
| 9,039,922 | B2 | 5/2015 | Rached |
| 9,127,191 | B2 | 9/2015 | Rached |
| 9,133,379 | B2 | 9/2015 | Rached |
| 9,175,203 | B2 | 11/2015 | Rached |
| 9,267,064 | B2 | 2/2016 | Rached |
| 9,315,708 | B2 | 4/2016 | Guerin et al. |
| 9,399,726 | B2 | 7/2016 | Rached |
| 9,505,968 | B2 | 11/2016 | Rached |
| 9,512,343 | B2 | 12/2016 | Rached et al. |
| 9,599,381 | B2 | 3/2017 | Rached |
| 9,650,551 | B2 | 5/2017 | Collier et al. |
| 9,650,553 | B2 | 5/2017 | Deur-Bert et al. |
| 9,663,697 | B2 | 5/2017 | Rached |
| 9,683,157 | B2 | 6/2017 | Rached |
| 9,884,984 | B2 | 2/2018 | Rached |
| 2006/0243944 | A1 | 11/2006 | Minor et al. |
| 2007/0007488 | A1 | 1/2007 | Singh et al. |
| 2008/0184731 | A1 | 8/2008 | Sienel et al. |
| 2008/0230738 | A1 | 9/2008 | Minor et al. |
| 2008/0314073 | A1 | 12/2008 | Minor |
| 2009/0120619 | A1 | 5/2009 | Sievert et al. |
| 2009/0253820 | A1 | 10/2009 | Bowman et al. |
| 2009/0314015 | A1 | 12/2009 | Minor et al. |
| 2010/0044619 | A1 | 2/2010 | Hulse et al. |
| 2010/0319377 | A1 | 12/2010 | Moriwaki et al. |
| 2010/0326129 | A1 | 12/2010 | Moriwaki et al. |
| 2011/0084228 | A1 | 4/2011 | Rached |
| 2011/0089366 | A1 | 4/2011 | Rached |
| 2011/0095224 | A1 | 4/2011 | Rached |

(Continued)

FOREIGN PATENT DOCUMENTS

EP 2 149 592 A2 2/2010
EP 2 246 649 A1 11/2010

(Continued)

OTHER PUBLICATIONS

U.S. Appl. No. 15/481,815, Collier et al.
U.S. Appl. No. 15/481,873, Deur-Bert et al.
U.S. Appl. No. 15/490,541, Deur-Bert et al.
U.S. Appl. No. 15/491,717, Rached et al.
International Search Report issued in PCT/FR2010/051727, dated Jan. 24, 2011, 4 pages, European Patent Office, Rijswijk, NL (English/French language versions).
Radermacher, R., et al., "Vapor Compression Heat Pumps with Refrigerant Mixtures," 2005, 4 pages, CRC Press, Taylor & Francis Group, Boca Raton, FL.
Bigot, G., et al., "Optimized Design of Heat Exchangers for "Reversible" Heat Pump Using R-407C," Paper 463, *Eighth International Refrigeration and Air Conditioning Conference at Purdue University*, West Lafayette, IN, USA, Jul. 25-28, 2000, pp. 38-46, Purdue University, Purdue e-Pubs, http://docs.lib.purdue.edu/iracc/463.

(Continued)

Primary Examiner — John R Hardee
(74) Attorney, Agent, or Firm — Buchanan Ingersoll & Rooney P.C.

(57) ABSTRACT

A heat transfer method using ternary composition containing 2,3,3,3-tetrafluoropropene, 1,1-difluoroethane and difluoromethane, as a heat transfer fluid in refrigeration systems, to replace R-134a. 1. A method of modifying a heat transfer system containing R-134a comprising removing R-134a and adding a composition comprising a refrigerant consisting essentially of: 70 to 88 wt % of 2,3,3,3-tetrafluoropropene; 4 to 16 wt % of difluoromethane; 8 to 14 wt % of 1,1-difluoroethane; and optionally, a stabilizer.

11 Claims, No Drawings

(56) References Cited

U.S. PATENT DOCUMENTS

| | | |
|---|---|---|
| 2011/0186772 A1 | 8/2011 | Rached |
| 2011/0219791 A1 | 9/2011 | Rached |
| 2011/0219792 A1 | 9/2011 | Rached |
| 2011/0240254 A1 | 10/2011 | Rached |
| 2011/0284181 A1 | 11/2011 | Rached |
| 2012/0049104 A1 | 3/2012 | Rached |
| 2012/0056123 A1 | 3/2012 | Rached |
| 2012/0068105 A1 | 3/2012 | Rached et al. |
| 2012/0097885 A9 | 4/2012 | Hulse et al. |
| 2012/0144857 A1 | 6/2012 | Rached |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0205574 A1 | 8/2012 | Rached et al. |
| 2013/0055733 A1 | 3/2013 | Rached |
| 2013/0055739 A1 | 3/2013 | Rached |
| 2013/0061613 A1 | 3/2013 | Rached |
| 2013/0092869 A1 | 4/2013 | Boussand |
| 2013/0105724 A1 | 5/2013 | Boussand |
| 2013/0186114 A1 | 7/2013 | Guerin et al. |
| 2014/0008565 A1 | 1/2014 | Rached et al. |
| 2014/0075969 A1 | 3/2014 | Guerin et al. |
| 2014/0166923 A1 | 6/2014 | Motta et al. |
| 2014/0318160 A1 | 10/2014 | Rached |
| 2014/0326017 A1 | 11/2014 | Rached |
| 2015/0027146 A1 | 1/2015 | Boussand |
| 2015/0152306 A1 | 6/2015 | Rached |
| 2015/0152307 A1 | 6/2015 | Rached |
| 2015/0322317 A1 | 11/2015 | Collier et al. |
| 2015/0322321 A1 | 11/2015 | Deur-Bert et al. |
| 2015/0344761 A1 | 12/2015 | Rached |
| 2015/0353799 A1 | 12/2015 | Deur-Bert et al. |
| 2015/0353802 A1 | 12/2015 | Rached |
| 2016/0009555 A1 | 1/2016 | Bonnet et al. |
| 2016/0024363 A1 | 1/2016 | Rached |
| 2016/0025394 A1 | 1/2016 | Rached |
| 2016/0115361 A1 | 4/2016 | Boussand |
| 2016/0122609 A1 | 5/2016 | Rached |
| 2016/0194541 A1 | 7/2016 | Guerin et al. |
| 2016/0244652 A1 | 8/2016 | Rached |
| 2016/0272561 A1 | 9/2016 | Rached et al. |
| 2016/0298014 A1 | 10/2016 | Rached |
| 2016/0376484 A1 | 12/2016 | Guerin et al. |
| 2017/0037291 A1 | 2/2017 | Rached et al. |
| 2017/0080773 A1 | 3/2017 | Rached |
| 2017/0145276 A1 | 5/2017 | Rached |
| 2017/0218242 A1 | 8/2017 | Rached |

FOREIGN PATENT DOCUMENTS

| | | |
|---|---|---|
| FR | 2 182 956 A3 | 12/1973 |
| FR | 2 256 381 A | 7/1975 |
| FR | 2 936 806 | 4/2010 |
| FR | 2 936 807 | 4/2010 |
| JP | 4110388 | 4/1992 |
| JP | 2008-134031 A | 6/2008 |
| JP | 2008-531836 A | 8/2008 |
| JP | 2009-222362 A | 10/2009 |
| JP | 2009-228984 A | 10/2009 |
| JP | 2009-257601 A | 11/2009 |
| JP | 2009-257655 A | 11/2009 |
| JP | 2010-002074 A | 1/2010 |
| JP | 2010-047754 A | 3/2010 |
| SU | 2 189 544 C2 | 9/2002 |
| WO | WO 2004/037913 A2 | 5/2004 |
| WO | WO 2004/037913 A3 | 5/2004 |
| WO | WO 2005/105947 A2 | 11/2005 |
| WO | WO 2006/094303 A2 | 9/2006 |
| WO | WO 2006/101563 A2 | 9/2006 |
| WO | WO 2006/101563 A3 | 9/2006 |
| WO | WO 2007/126414 A2 | 11/2007 |
| WO | WO 2007/126414 A3 | 11/2007 |
| WO | WO 2008/009922 A2 | 1/2008 |
| WO | WO 2008/027555 A2 | 3/2008 |
| WO | WO 2008/027555 A3 | 3/2008 |
| WO | WO 2008/085314 A2 | 7/2008 |
| WO | WO 2008/140809 A2 | 11/2008 |
| WO | WO 2009/107364 A1 | 9/2009 |
| WO | WO 2009/110228 A1 | 9/2009 |
| WO | WO 2010/000994 A2 | 1/2010 |
| WO | WO 2010/000994 A3 | 1/2010 |
| WO | WO 2010/040928 A1 | 4/2010 |
| WO | WO 2010/059677 A2 | 5/2010 |
| WO | WO 2010/059677 A3 | 5/2010 |
| WO | WO 2011/030029 A1 | 3/2011 |
| WO | WO 2011/141654 A2 | 11/2011 |
| WO | WO 2011/141654 A3 | 11/2011 |

OTHER PUBLICATIONS

Liu, X., "Efficiency of Non-Azeotropic Refrigerant Cycle," *International Refrigeration and Air Conditioning Conference*, Paper 396, 1998, pp. 108-114, Purdue University, Purdue e-Pubs, http://docs.lib.purdue.edu/iracc/396.

Minor, Barbara Haviland, et al., Certified U.S. Appl. No. 61/116,029, filed Nov. 19, 2008, 60 pages, including cover page.

Minor, Barbara Haviland, et al., Certified U.S. Appl. No. 61/180,201, filed May 21, 2009, 63 pages, including cover page.

Collier, Bertrand, et al., U.S. Appl. No. 15/481,815 entitled "Composition including 2.3,3.3-Tetrafluoropropene," filed in the U.S. Patent and Trademark Office on Apr. 7, 2017.

Deur-Bert, Dominique, et al., U.S. Appl. No. 15/481,873 entitled "Azeotropic or Quasi-Azeotropic Composition of Chloromehtane," filed in the U.S. Patent and Trademark Office on Apr. 7, 2017.

Deur-Bert, Dominique, et al., U.S. Appl. No. 15/490,541 entitled "Composition Containing 2.3,3.3-Tetrafluoropropene and 1,2-Difluoroethylene," filed in the U.S. Patent and Trademark Office on Apr. 18, 2017.

Rached, Wissam, U.S. Appl. No. 15/491,717 entitled "Heat Transfer Method," filed in the U.S. Patent and Trademark Office on Apr. 19, 2017.

U.S. Appl. No. 13/128,996, Wissam Rached, filed May 12, 2011.
U.S. Appl. No. 13/129,240, Wissam Rached, filed May 13, 2011.
U.S. Appl. No. 13/146,721, Wissam Rached, filed Jul. 28, 2011.
U.S. Appl. No. 13/808,326, Bétrice Boussand, filed Jan. 4, 2013.
U.S. Appl. No. 14/371,118, Bétrice Boussand, filed Jul. 8, 2014.
U.S. Appl. No. 14/615,780, Wissam Rached, filed Feb. 6, 2015.
U.S. Appl. No. 14/651,925, Dominique Deur-Bert, filed Jun. 12, 2015.
U.S. Appl. No. 14/830,130, Wissam Rached, filed Aug. 19, 2015.
U.S. Appl. No. 14/772,950, Phillippe Bonnet, filed Sep. 4, 2015.
U.S. Appl. No. 14/990,159, Bétrice Boussand, filed Jan. 7, 2016.
U.S. Appl. No. 14/992,387, Wissam Rached, filed Jan. 11, 2016.
U.S. Appl. No. 15/070,955, Sophie Guerin, filed Mar. 15, 2016.
U.S. Appl. No. 15/073,108, Wissam Rached, filed Mar. 17, 2016.
U.S. Appl. No. 15/142,898, Wissam Rached, filed Apr. 29, 2016.
U.S. Appl. No. 14/903,461, Sophie Guerin, filed Jan. 7, 2016.
U.S. Appl. No. 15/297,569, Wissam Rached, filed Oct. 19, 2016.
U.S. Appl. No. 15/368,347, Wissam Rached, filed Dec. 2, 2016.
U.S. Appl. No. 15/396,855, Wissam Rached, filed Jan. 3, 2017.
U.S. Appl. No. 15/481,815, Bertrand Collier, filed Apr. 7, 2017.
U.S. Appl. No. 15/481,873, Dominique Deur-Bert, filed Apr. 7, 2017.
U.S. Appl. No. 15/490,541, Dominique Deur-Bert, filed Apr. 18, 2017.
U.S. Appl. No. 15/491,717, Wissam Rached, filed Apr. 19, 2017.

Rached, Wissam, U.S. Appl. No. 15/809,164 entitled "Vehicle Heating and/or Air Conditioning Method," filed in the U.S. Patent and Trademark Office on Nov. 10, 2017.

Rached, Wissam, U.S. Appl. No. 15/820,996 entitled "Method for Heating and/or Air Conditioning a Vehicle," filed in the U.S. Patent and Trademark Office on Nov. 22, 2017.

Rached, Wissam, U.S. Appl. No. 15/856,703 entitled "Binary Refrigerating Fluid," filed in the U.S. Patent and Trademark Office on Dec. 26, 2017.

(56) References Cited

OTHER PUBLICATIONS

Rached, Wissam, U.S. Appl. No. 15/878,794 entitled "Stabilization of 1-Chloro-3,3,3-Trifluoropropene," filed in the U.S. Patent and Trademark Office on Jan. 24, 2018.

HEAT TRANSFER FLUID REPLACING R-134A

CROSS REFERENCE TO RELATED APPLICATIONS

The present application is a continuation-in-part of U.S. application Ser. No. 14/615,741, filed on Feb. 6, 2015, now abandoned which is a continuation of U.S. application Ser. No. 13/391,417, filed on Mar. 8, 2012, now U.S. Pat. No. 9,011,711, which is a U.S. National Stage of International Application No. PCT/FR2010/051727, filed on August 17, 201, which claims the benefit of French Application No. 09.56245, filed on Sep. 11, 2009. The entire contents of each of U.S. application Ser. No. 14/615,741, U.S. application Ser. No. 13/391,417, International Application No. PCT/FR2010/051727, and French Application No. 09.56245 are hereby incorporated herein by reference in their entirety.

TECHNICAL FIELD

Embodiments of the present invention relate to the use of ternary compositions of 2,3,3,3-tetrafluoropropene as heat transfer fluids replacing R-410A or R-134a.

BACKGROUND

The problems posed by substances with ozone depletion potential (ODP) were discussed in Montreal, where the protocol was signed requiring a reduction of the production and use of chlorofluorocarbons (CFCs). Amendments have been made to this protocol, requiring abandonment of CFCs and extending the regulations to cover other products, including hydrochlorofluorocarbons (HCFCs).

The refrigeration and air conditioning industry has made a considerable investment in substitution of these refrigerants, and accordingly hydrofluorocarbons (HFCs) were put on the market.

The (hydro)chlorofluorocarbons used as expanding agents or solvents have also been replaced with HFCs.

In the automobile industry, the systems for air conditioning of vehicles marketed in many countries have changed over from a chlorofluorocarbon refrigerant (CFC-12) to a hydrofluorocarbon refrigerant (1,1,1,2-tetrafluoroethane: HFC-134a), which is less harmful to the ozone layer. However, with respect to the objectives established by the Kyoto protocol, HFC-134a (GWP=1300) is considered to have a high warming power. A fluid's contribution to the greenhouse effect is quantified by a criterion, GWP (Global Warming Potential), which summarizes the warming power by taking a reference value of 1 for carbon dioxide.

As carbon dioxide is nontoxic, nonflammable and has a very low GWP, it has been proposed as a refrigerant for air conditioning systems in place of HFC-134a. However, the use of carbon dioxide has several drawbacks, notably connected with the very high pressure for its application as refrigerant in existing equipment and technologies.

Moreover, the mixture R-410A consisting of 50 wt. % of pentafluoroethane and 50 wt. % of HFC-134a is widely used as refrigerant in stationary air conditioners. However, this mixture has a GWP of 2100.

Document JP 4110388 describes the use of hydrofluoropropenes of formula $C_3H_mF_n$, with m, n representing an integer between 1 and 5 inclusive and m+n=6, as heat transfer fluids, in particular tetrafluoropropene and trifluoropropene.

Document WO 2004/037913 discloses the use of compositions comprising at least one fluoroalkene having three or four carbon atoms, notably pentafluoropropene and tetrafluoropropene, preferably having a GWP of at most 150, as heat transfer fluids.

Document WO 2005/105947 teaches the addition to tetrafluoropropene, preferably 1,3,3,3-tetrafluoropropene, of an expanding co-agent such as difluoromethane, pentafluoroethane, tetrafluoroethane, difluoroethane, heptafluoropropane, hexafluoropropane, pentafluoropropane, pentafluorobutane, water and carbon dioxide.

Document WO 2006/094303 discloses an azeotropic composition containing 7.4 wt. % of 2,3,3,3-tetrafluoropropene (1234yf) and 92.6 wt. % of difluoromethane (HFC-32). This document also discloses an azeotropic composition containing 91 wt. % of 2,3,3,3-tetrafluoropropene and 9 wt. % of difluoroethane (HFC-152a).

A heat exchanger is a device for transferring thermal energy from one fluid to another, without mixing them. The thermal flux passes through the exchange surface that separates the fluids. Mostly this method is used for cooling or heating a liquid or a gas that cannot be cooled or heated directly.

In compression systems, heat exchange between the refrigerant and the heat sources takes place via heat-transfer fluids. These heat transfer fluids are in the gaseous state (the air in air conditioning and direct-expansion refrigeration), liquid (water in domestic heat pumps, glycol solution) or two-phase.

There are various transfer modes:
- the two fluids are arranged in parallel and go in the same sense: co-current mode (antimethodical);
- the two fluids are arranged in parallel but go in the opposite sense: countercurrent mode (methodical);
- the two fluids are positioned perpendicularly: crossed-current mode. The crossed current can have co-current or countercurrent tendency;
- one of the two fluids makes a U-turn in a wider pipeline, which the second fluid passes through. This configuration is comparable to a co-current exchanger on half its length, and to a countercurrent exchanger for the other half: pin-head mode.

DETAILED DESCRIPTION

The applicant has now discovered that ternary compositions of 2,3,3,3-tetrafluoropropene, 1,1-difluoroethane and difluoromethane are particularly advantageous as heat transfer fluid.

These compositions have both a zero ODP and a GWP below that of existing heat transfer fluids such as R-410A or R-134a.

Moreover, their performance (COP: coefficient of performance, defined as the useful power delivered by the system to the power supplied to or consumed by the system) is greater than that of existing heat transfer fluids such as R-410A or R-134a.

The compositions used as heat transfer fluid in embodiments of the present invention have a critical temperature above 87° C. (the critical temperature of R410A is 70.5° C.). These compositions can be used in heat pumps for supplying heat at temperatures up to 65° C. but also at higher temperatures up to 87° C. (temperature range where R-410A cannot be used).

The compositions used as heat transfer fluid in embodiments of the present invention have temperatures at the compressor outlet equivalent to the values given by R-410A.

The pressures at the condenser are lower than the pressures of R-410A and the compression ratios are also lower. These compositions can use the same compressor technology as used with R-410A.

The compositions used as heat transfer fluid in embodiments of the present invention have temperatures at the compressor outlet less than the values given by R-134a. The pressures at the condenser and evaporater are higher than the pressures of R-134a in order to give a lower compression ratios. These compositions can use the same compressor technology as used with R-134a.

The compositions used as heat transfer fluid in embodiments of the present invention have saturated-vapor densities below the saturated-vapor density of R-410A. The volumetric capacities given by these compositions are equivalent to the volumetric capacity of R-410A (between 91 and 95%). Owing to these properties, these compositions operate with smaller pipeline diameters and therefore less head loss in the vapor pipelines, which increases the performance of the installations.

These compositions are suitable preferably in compression-type refrigeration systems with exchangers operating in countercurrent mode or in crossed-current mode with countercurrent tendency.

Thus, these compositions can be used as heat transfer fluid in heat pumps, optionally reversible, in air conditioning, and in low-temperature and medium-temperature refrigeration employing compression systems with exchangers in countercurrent mode or in crossed-current mode with countercurrent tendency. Embodiments of the present invention therefore relate to the use of ternary compositions of 2,3,3,3-tetrafluoropropene, 1,1-difluoroethane and difluoromethane as heat transfer fluid in refrigeration systems replacing the mixture R-410A or replacing R-134a.

Preferably, these compositions are used in compression-type refrigeration systems with exchangers operating in countercurrent mode or in crossed-current mode with countercurrent tendency.

Preferably, the compositions used in embodiments of the present invention contain essentially from 5 to 83 wt. % of 2,3,3,3-tetrafluoropropene and from 2 to 50 wt. % of 1,1-difluoroethane and from 15 to 75 wt. % of difluoromethane.

Advantageously, the compositions used contain essentially from 5 to 63 wt. % of 2,3,3,3-tetrafluoropropene and from 2 to 25 wt. % of difluoroethane and from 35 to 70 wt. % of difluoromethane.

The compositions that are particularly preferred contain essentially from 40 to 58 wt. % of 2,3,3,3-tetrafluoropropene, from 40 to 50 wt. % of difluoromethane and from 2 to 10 wt. % of 1,1-difluoroethane.

The compositions used in embodiments of the present invention can be stabilized. The stabilizer preferably represents at most 5 wt. % relative to the total composition.

As stabilizers, we may notably mention nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl optionally fluorinated or perfluorinated or alkenyl or aromatic) such as n-butyl glycidyl ether, hexanediol diglycidyl ether, allyl glycidyl ether, butylphenylglycidyl ether, phosphites, phosphates, phosphonates, thiols and lactones.

Another object of embodiments of the present invention relates to a method of heat transfer in which the aforementioned ternary compositions of 2,3,3,3-tetrafluoropropene, 1,1-difluoroethane and difluoromethane are used as heat transfer fluid in refrigeration systems replacing the mixture R-410A.

Preferably, the method is employed in compression-type refrigeration systems with exchangers operating in countercurrent mode or in crossed-current mode with countercurrent tendency.

The method according to embodiments of the present invention can be implemented in the presence of lubricants such as mineral oil, alkylbenzene, polyalkylene glycol and polyvinyl ether.

The compositions used in embodiments of the present invention are suitable for replacing R-410A or R-134a in refrigeration, air conditioning and heat pumps with the existing installations.

An embodiment of the present invention further relates to the use of ternary compositions of 2,3,3,3-tetrafluoropropene, 1,1-difluoroethane and difluoromethane as heat transfer fluid in refrigeration systems replacing R-134a.

Preferably, these compositions are used in compression-type refrigeration systems, currently using R-134a, with exchangers operating in countercurrent mode or in crossed-current mode with countercurrent tendency.

Preferably, the compositions used to replace R-134a include, consist essentially of, or consist of from 70 to 88 wt. % of 2,3,3,3-tetrafluoropropene, from 8 to 14 wt. % of 1,1-difluoroethane, and from 4 to 16 wt. % of difluoromethane.

Advantageously, the compositions used include, consist essentially of, or consist of from 84 to 88 (or 85 to 88, or 86 to 88) wt. % of 2,3,3,3-tetrafluoropropene, from 11 to 14 wt. % of 1,1-difluoroethane, and from 4 to 14 (or 4 to 13, or 4 to 12) wt. % of difluoromethane.

The compositions used for replacing R-134a can be stabilized. The stabilizer preferably represents at most 5 wt. % relative to the total composition.

As stabilizers, we may notably mention nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl optionally fluorinated or perfluorinated or alkenyl or aromatic) such as n-butyl glycidyl ether, hexanediol diglycidyl ether, allyl glycidyl ether, butylphenylglycidyl ether, phosphites, phosphates, phosphonates, thiols and lactones.

Another embodiment of the present invention relates to a method of heat transfer in which the aforementioned ternary compositions of 2,3,3,3-tetrafluoropropene, 1,1-difluoroethane and difluoromethane are used as heat transfer fluid in refrigeration systems replacing the R134a.

Preferably, the method is employed in compression-type refrigeration systems with exchangers operating in countercurrent mode or in crossed-current mode with countercurrent tendency.

A method according to an embodiment of the present invention can be implemented in the presence of lubricants such as mineral oil, alkylbenzene, polyalkylene glycol and polyvinyl ether.

The compositions used in embodiments of the present invention are suitable for replacing R-134a in refrigeration, air conditioning and heat pumps with the existing installations.

When the compositions are used to replace R-134a, at least the following advantages may be obtained:
  high COP and CAP, as compared to when R-134a was used;
  Discharge temperature lower than R134a; and
  Pressure ratio lower than R134a and efficiency higher.

Experimental Section
Tools for Calculation

The RK-Soave equation is used for calculating the densities, enthalpies, entropies and the data on liquid-vapor equilibrium of the mixtures. To use this equation it is necessary to know the properties of the pure substances used in the mixtures in question as well as the coefficients of interaction for each binary mixture.

The data required for each pure substance are:
Boiling point, critical temperature and pressure, curve of pressure as a function of temperature from the boiling point to the critical point, the saturated liquid density and saturated vapor density as a function of temperature.
HFC-32, HFC-152a:

The data for these products are published in ASHRAE Handbook 2005 chapter 20, and are also available using Refrop (software developed by NIST for calculating the properties of refrigerants).
HFO-1234yf:

The data for the temperature-pressure curve of HFO-1234yf are measured by the static method. The critical temperature and pressure are measured with a C80 calorimeter marketed by Setaram. The densities, at saturation as a function of temperature, are measured by the vibrating tube densimeter technology developed by the laboratories of the Ecole de Mines ("Mining Engineering College") in Paris.
Coefficient of Interaction of the Binary Mixtures The RK-Soave equation uses coefficients of binary interaction for representing the behavior of the products in mixtures. The coefficients are calculated as a function of experimental data for liquid-vapor equilibrium.

The technique used for the measurements of liquid-vapor equilibrium is the static analytical cell method. The equilibrium cell comprises a sapphire tube and is equipped with two ROLSI™ electromagnetic samplers. It is immersed in a cryothermostat bath (HUBER HS40). Magnetic stirring driven by a field rotating at variable speed is used for accelerating attainment of the equilibria. The samples are analyzed by gas chromatography (HP5890 series II) using a catharometer (TCD).
HFC-32/HFO-1234yf, HFC-152a/HFO-1234yf:

The measurements of liquid-vapor equilibrium on the HFC-32/HFO-1234yf binary mixture are performed for the following isotherms: −10° C., 30° C. and 70° C.

The measurements of liquid-vapor equilibrium on the HFC-152a/HFO-1234yf binary mixture are performed for the following isotherms: 10° C.
HFC-32/HFO-152a:

The data on liquid-vapor equilibrium for the HFC-152a/HFC-32 binary mixture are available using Refprop. Two isotherms (−20° C. and 20° C.) and two isobars (1 bar and 25 bar) are used for calculating the coefficients of interaction for this binary.
Compression System Consider a compression system equipped with an evaporator and countercurrent condenser, a screw compressor and a pressure reducing valve.

The system operates with 15° C. of superheating and 5° C. of supercooling. The minimum temperature difference between the secondary fluid and the refrigerant is considered to be of the order of 5° C.

The isentropic efficiency of the compressors is a function of the compression ratio. This efficiency is calculated from the following equation:

$$\eta_{isen} = a - b(\tau - c)^2 - \frac{d}{\tau - e} \quad (1)$$

For a screw compressor, the constants a, b, c, d and e in equation (1) of isentropic efficiency are calculated using standard data published in the handbook "Handbook of air conditioning and refrigeration", page 11.52.

% CAP is the percentage of the ratio of the volumetric capacity supplied by each product to the capacity of R-410A.

The coefficient of performance (COP) is defined as the ratio of the useful power delivered by the system to the power supplied to or consumed by the system.

The Lorenz coefficient of performance ($COP_{Lorenz}$) is a reference coefficient of performance. It is a function of temperature and is used for comparing the COPs of different fluids.

The Lorenz coefficient of performance is defined as follows:

(The temperatures T are in K)

$$T_{mean}^{condenser} = 0.5 \times (T_{inlet}^{condenser} + T_{outlet}^{condenser}) \quad (2)$$

$$T_{mean}^{evaporator} = 0.5 \times (T_{inlet}^{evaporator} + T_{outlet}^{evaporator}) \quad (3)$$

The $COP_{Lorenz}$ in the case of air conditioning and refrigeration is:

$$COPlorenz = \frac{T_{mean}^{evaporator}}{T_{mean}^{condenser} - T_{mean}^{evaporator}} \quad (4)$$

The $COP_{Lorenz}$ in the case of heating is:

$$COPlorenz = \frac{T_{mean}^{condenser}}{T_{mean}^{condenser} - T_{mean}^{evaporator}} \quad (5)$$

For each composition, the coefficient of performance of the Lorenz cycle is calculated as a function of the corresponding temperatures.

% COP/$COP_{Lorenz}$ is the ratio of the COP of the system relative to the COP of the corresponding Lorenz cycle.
Results, Cooling Mode or Air Conditioning In cooling mode, the compression system operates between a refrigerant inlet temperature at the evaporator of −5° C. and a refrigerant inlet temperature at the condenser of 50° C. The system delivers cold at 0° C.

The performance of the compositions according to embodiments of the invention in cooling operating conditions is given in Table 1. The values of the constituents (HFO-1234yf, HFC-32, HFC-152a) for each composition are given as percentage by weight.

TABLE 1

| | | | Temp outlet evap (° C.) | Temp outlet comp (° C.) | T outlet cond (° C.) | evap P (bar) | cond P (bar) | Ratio (w/w) | Shift | efficiency comp | % CAP | % COP/ COPLorenz |
|---|---|---|---|---|---|---|---|---|---|---|---|---|
| | R410A | | −5 | 101 | 50 | 6.8 | 30.6 | 4.5 | 0.07 | 79.6 | 100 | 50.4 |
| HFO-1234yf | HFC-32 | HFC-152a | | | | | | | | | | |
| 50 | 45 | 5 | −1 | 95 | 45 | 5.6 | 23.3 | 4.2 | 4.00 | 80.5 | 92 | 55.9 |
| 45 | 50 | 5 | −2 | 99 | 46 | 5.7 | 24.4 | 4.2 | 3.48 | 80.3 | 95 | 55.4 |
| 45 | 45 | 10 | −1 | 97 | 45 | 5.4 | 22.8 | 4.2 | 4.26 | 80.4 | 92 | 56.5 |
| 40 | 50 | 10 | −1 | 100 | 46 | 5.6 | 23.9 | 4.3 | 3.87 | 80.2 | 95 | 56.1 |

TABLE 2

| | | | Evaporator saturation vapor | compressor discharge | Discharge diff versus ref product | condenser saturation liquid | Evaporator Glide | High P (bar) | Low P (bar) | pressure ratio | isentropic efficiency | % CAP (Cooling) | % COP (Cooling) |
|---|---|---|---|---|---|---|---|---|---|---|---|---|---|
| | % wt | | | | | | | | | | | | |
| | R134A | | −5.0 | 81.0 | 0.0 | 50.0 | 0.0 | 13.2 | 2.4 | 5.4 | 75.9 | 100 | 100 |
| R32 | R1234yf | R152a | | | | | | | | | | | |
| 4 | 88 | 8 | −3.8 | 71.6 | −9.5 | 46.9 | 1.3 | 14.1 | 3.0 | 4.7 | 78.7 | 112 | 104 |
| 6 | 86 | 8 | −2.8 | 72.4 | −8.7 | 45.9 | 2.2 | 14.5 | 3.2 | 4.6 | 79.3 | 121 | 108 |
| 8 | 84 | 8 | −2.2 | 73.3 | −7.7 | 45.1 | 2.8 | 15.0 | 3.4 | 4.5 | 79.6 | 128 | 111 |
| 10 | 82 | 8 | −1.9 | 74.4 | −6.7 | 44.6 | 3.1 | 15.5 | 3.5 | 4.4 | 79.7 | 134 | 112 |
| 12 | 80 | 8 | −1.3 | 75.2 | −5.8 | 44.2 | 3.8 | 16.0 | 3.7 | 4.3 | 80.0 | 141 | 114 |
| 14 | 78 | 8 | −0.6 | 76.1 | −4.9 | 44.0 | 4.4 | 16.4 | 3.9 | 4.2 | 80.3 | 149 | 117 |
| 16 | 76 | 8 | −0.6 | 77.2 | −3.8 | 43.9 | 4.4 | 16.9 | 4.0 | 4.2 | 80.3 | 153 | 116 |
| 4 | 84 | 12 | −3.8 | 72.7 | −8.4 | 47.1 | 1.3 | 14.1 | 3.0 | 4.7 | 78.7 | 112 | 104 |
| 6 | 82 | 12 | −3.1 | 73.6 | −7.5 | 46.2 | 1.9 | 14.5 | 3.1 | 4.6 | 79.1 | 119 | 107 |
| 8 | 80 | 12 | −2.5 | 74.5 | −6.6 | 45.5 | 2.5 | 15.0 | 3.3 | 4.5 | 79.4 | 126 | 110 |
| 10 | 78 | 12 | −1.9 | 75.4 | −5.7 | 45.0 | 3.1 | 15.4 | 3.5 | 4.4 | 79.7 | 134 | 112 |
| 12 | 76 | 12 | −1.3 | 76.2 | −4.8 | 44.6 | 3.8 | 15.8 | 3.6 | 4.3 | 80.0 | 141 | 115 |
| 14 | 74 | 12 | −1.3 | 77.4 | −3.7 | 44.3 | 3.8 | 16.3 | 3.7 | 4.3 | 80.0 | 145 | 115 |
| 16 | 72 | 12 | −0.6 | 78.2 | −2.9 | 44.2 | 4.4 | 16.7 | 3.9 | 4.3 | 80.3 | 152 | 117 |
| 4 | 82 | 14 | −3.8 | 73.2 | −7.8 | 47.3 | 1.3 | 14.0 | 3.0 | 4.7 | 78.7 | 113 | 105 |
| 6 | 80 | 14 | −3.1 | 74.1 | −6.9 | 46.3 | 1.9 | 14.5 | 3.1 | 4.6 | 79.0 | 119 | 107 |
| 8 | 78 | 14 | −2.5 | 75.0 | −6.0 | 45.6 | 2.5 | 14.9 | 3.3 | 4.5 | 79.4 | 126 | 110 |
| 10 | 76 | 14 | −1.9 | 75.9 | −5.2 | 45.1 | 3.1 | 15.4 | 3.5 | 4.4 | 79.7 | 133 | 113 |
| 12 | 74 | 14 | −1.3 | 76.7 | −4.3 | 44.7 | 3.8 | 15.8 | 3.6 | 4.4 | 80.0 | 141 | 115 |
| 14 | 72 | 14 | −1.3 | 77.9 | −3.2 | 44.5 | 3.8 | 16.2 | 3.7 | 4.4 | 80.0 | 145 | 115 |
| 16 | 70 | 14 | −0.6 | 78.6 | −2.4 | 44.3 | 4.4 | 16.6 | 3.9 | 4.3 | 80.3 | 152 | 117 |

Results, Heating Mode

In heating mode, the compression system operates between a refrigerant inlet temperature at the evaporator of −5° C. and a refrigerant inlet temperature at the condenser of 50° C. The system delivers heat at 45° C.

The performance of the compositions according to embodiments of the invention in operating conditions in heating mode is given in Table 2. The values of the constituents (HFO-1234yf, HFC-32, HFC-152a) for each composition are given as percentage by weight.

TABLE 3

| | | | Temp outlet evap (° C.) | Temp outlet comp (° C.) | T outlet cond (° C.) | evap P (bar) | cond P (bar) | Ratio (w/w) | Shift | efficiency comp | % CAP | % COP/ COPLorenz |
|---|---|---|---|---|---|---|---|---|---|---|---|---|
| | R410A | | −5 | 101 | 50 | 6.8 | 30.6 | 4.5 | 0.07 | 79.6 | 100 | 58.8 |
| HFO-1234yf | HFC-32 | HFC-152a | | | | | | | | | | |
| 45 | 50 | 5 | −2 | 99 | 46 | 5.7 | 24.4 | 4.2 | 3.48 | 80.3 | 92 | 63.1 |
| 40 | 50 | 10 | −1 | 100 | 46 | 5.6 | 23.9 | 4.3 | 3.87 | 80.2 | 91 | 63.6 |

TABLE 4

| | % wt | | Evaporator saturation vapor | compressor discharge | Discharge diff versus ref product | condenser saturation liquid | Evaporator Glide | High P (bar) | Low P (bar) | pressure ratio | isentropic efficiency | % CAP Heating | % COP Heating |
|---|---|---|---|---|---|---|---|---|---|---|---|---|---|
| | R134A | | −5.0 | 81.0 | 0.0 | 50.0 | 0.0 | 13.2 | 2.4 | 5.4 | 75.9 | 100 | 100 |
| R32 | R1234yf | R152a | | | | | | | | | | | |
| 4 | 88 | 8 | −3.8 | 71.6 | −9.5 | 46.9 | 1.3 | 14.1 | 3.0 | 4.7 | 78.7 | 110 | 104 |
| 6 | 86 | 8 | −2.8 | 72.4 | −8.7 | 45.9 | 2.2 | 14.5 | 3.2 | 4.6 | 79.3 | 117 | 107 |
| 8 | 84 | 8 | −2.2 | 73.3 | −7.7 | 45.1 | 2.8 | 15.0 | 3.4 | 4.5 | 79.6 | 124 | 109 |
| 10 | 82 | 8 | −1.9 | 74.4 | −6.7 | 44.6 | 3.1 | 15.5 | 3.5 | 4.4 | 79.7 | 129 | 109 |
| 12 | 80 | 8 | −1.3 | 75.2 | −5.8 | 44.2 | 3.8 | 16.0 | 3.7 | 4.3 | 80.0 | 136 | 111 |
| 14 | 78 | 8 | −0.6 | 76.1 | −4.9 | 44.0 | 4.4 | 16.4 | 3.9 | 4.2 | 80.3 | 142 | 113 |
| 16 | 76 | 8 | −0.6 | 77.2 | −3.8 | 43.9 | 4.4 | 16.9 | 4.0 | 4.2 | 80.3 | 147 | 113 |
| 4 | 84 | 12 | −3.8 | 72.7 | −8.4 | 47.1 | 1.3 | 14.1 | 3.0 | 4.7 | 78.7 | 110 | 104 |
| 6 | 82 | 12 | −3.1 | 73.6 | −7.5 | 46.2 | 1.9 | 14.5 | 3.1 | 4.6 | 79.1 | 116 | 106 |
| 8 | 80 | 12 | −2.5 | 74.5 | −6.6 | 45.5 | 2.5 | 15.0 | 3.3 | 4.5 | 79.4 | 123 | 108 |
| 10 | 78 | 12 | −1.9 | 75.4 | −5.7 | 45.0 | 3.1 | 15.4 | 3.5 | 4.4 | 79.7 | 129 | 110 |
| 12 | 76 | 12 | −1.3 | 76.2 | −4.8 | 44.6 | 3.8 | 15.8 | 3.6 | 4.3 | 80.0 | 135 | 111 |
| 14 | 74 | 12 | −1.3 | 77.4 | −3.7 | 44.3 | 3.8 | 16.3 | 3.7 | 4.3 | 80.0 | 139 | 111 |
| 16 | 72 | 12 | −0.6 | 78.2 | −2.9 | 44.2 | 4.4 | 16.7 | 3.9 | 4.3 | 80.3 | 146 | 113 |
| 4 | 82 | 14 | −3.8 | 73.2 | −7.8 | 47.3 | 1.3 | 14.0 | 3.0 | 4.7 | 78.7 | 110 | 104 |
| 6 | 80 | 14 | −3.1 | 74.1 | −6.9 | 46.3 | 1.9 | 14.5 | 3.1 | 4.6 | 79.0 | 116 | 106 |
| 8 | 78 | 14 | −2.5 | 75.0 | −6.0 | 45.6 | 2.5 | 14.9 | 3.3 | 4.5 | 79.4 | 123 | 108 |
| 10 | 76 | 14 | −1.9 | 75.9 | −5.2 | 45.1 | 3.1 | 15.4 | 3.5 | 4.4 | 79.7 | 129 | 110 |
| 12 | 74 | 14 | −1.3 | 76.7 | −4.3 | 44.7 | 3.8 | 15.8 | 3.6 | 4.4 | 80.0 | 135 | 112 |
| 14 | 72 | 14 | −1.3 | 77.9 | −3.2 | 44.5 | 3.8 | 16.2 | 3.7 | 4.4 | 80.0 | 139 | 111 |
| 16 | 70 | 14 | −0.6 | 78.6 | −2.4 | 44.3 | 4.4 | 16.6 | 3.9 | 4.3 | 80.3 | 146 | 113 |

Results, Low-Temperature Refrigeration

In low-temperature refrigeration mode, the compression system operates between a refrigerant inlet temperature at the evaporator of −30° C. and a refrigerant inlet temperature at the condenser of 40° C. The system delivers cold at −25° C.

The performance of the compositions according to embodiments of the invention in operating conditions in refrigeration mode is given in Table 3. The values of the constituents (HFO-1234yf, HFC-32, HFC-152a) for each composition are given as percentage by weight.

TABLE 5

| | | | Temp outlet evap (° C.) | Temp outlet comp (° C.) | T outlet cond (° C.) | evap P (bar) | cond P (bar) | Ratio (w/w) | Shift | efficiency comp | % CAP | % COP/ COPLorenz |
|---|---|---|---|---|---|---|---|---|---|---|---|---|
| | R410A | | −30 | 149 | 40 | 2.7 | 24.2 | 9.0 | 0.06 | 52.3 | 100 | 33.0 |
| HFO-1234yf | HFC-32 | HFC-152a | | | | | | | | | | |
| 45 | 50 | 5 | −27 | 137 | 36 | 2.3 | 19.1 | 8.4 | 3.35 | 56.9 | 93 | 38.8 |
| 40 | 50 | 10 | −26 | 140 | 35 | 2.2 | 18.6 | 8.5 | 3.73 | 56.4 | 93 | 38.9 |

The invention claimed is:

1. A method of modifying a heat transfer system containing R-134a comprising removing R-134a and adding a composition comprising a refrigerant consisting essentially of:
   70 to 88 wt % of 2,3,3,3-tetrafluoropropene;
   4 to 16 wt % of difluoromethane;
   8 to 14 wt % of 1,1-difluoroethane; and
   optionally, a stabilizer.

2. The method as claimed in claim 1, wherein the refrigerant consists essentially of 2,3,3,3-tetrafluoropropene, difluoromethan, 1,1-difluoroethane, and the stabilizer.

3. The method as claimed in claim 2, wherein the stabilizer is selected from the group consisting of nitromethane, ascorbic acid, terephthalic acid, azoles, phenolic compounds, epoxides, phosphites, phosphates, phosphonates, thiols and lactones.

4. The method as claimed in claim 2, wherein stabilizer represents at most 5% by weight relative to the refrigerant.

5. The method as claimed in claim 1, wherein the heat transfer system is of the compression type.

6. The method as claimed in claim 5, wherein the heat transfer system operates with exchangers in countercurrent mode or in crossed-current mode with countercurrent tendency.

7. The method as claimed in claim 1, wherein the composition further comprises a lubricant.

8. The method as claimed in claim 7, wherein the lubricant is selected from the group consisting of mineral oil, alkylbenzene, polyalkylene glycol and polyvinyl ether.

9. The method as claimed in claim 1, wherein the refrigerant consists essentially of:
   84 to 88 wt % of 2,3,3,3-tetrafluoropropene;
   4 to 14 wt % of difluoromethane;
   11 to 14 wt % of 1,1-difluoroethane; and
   optionally, a stabilizer.

10. The method as claimed in claim 1, wherein the refrigerant consists of:

84 to 88 wt % of 2,3,3,3-tetrafluoropropene;
4 to 14 wt % of difluoromethane;
11 to 14 wt % of 1,1-difluoroethane; and
optionally, a stabilizer.

11. The method as claimed in claim 1, wherein the refrigerant consists of:
70 to 88 wt % of 2,3,3,3-tetrafluoropropene;
4 to 16 wt % of difluoromethane;
8 to 14 wt % of 1,1-difluoroethane; and
optionally, a stabilizer.

* * * * *